(No Model.)
W. A. ANTHONY.
ELECTRO MAGNETIC SEPARATOR.
No. 411,414. Patented Sept. 24, 1889.
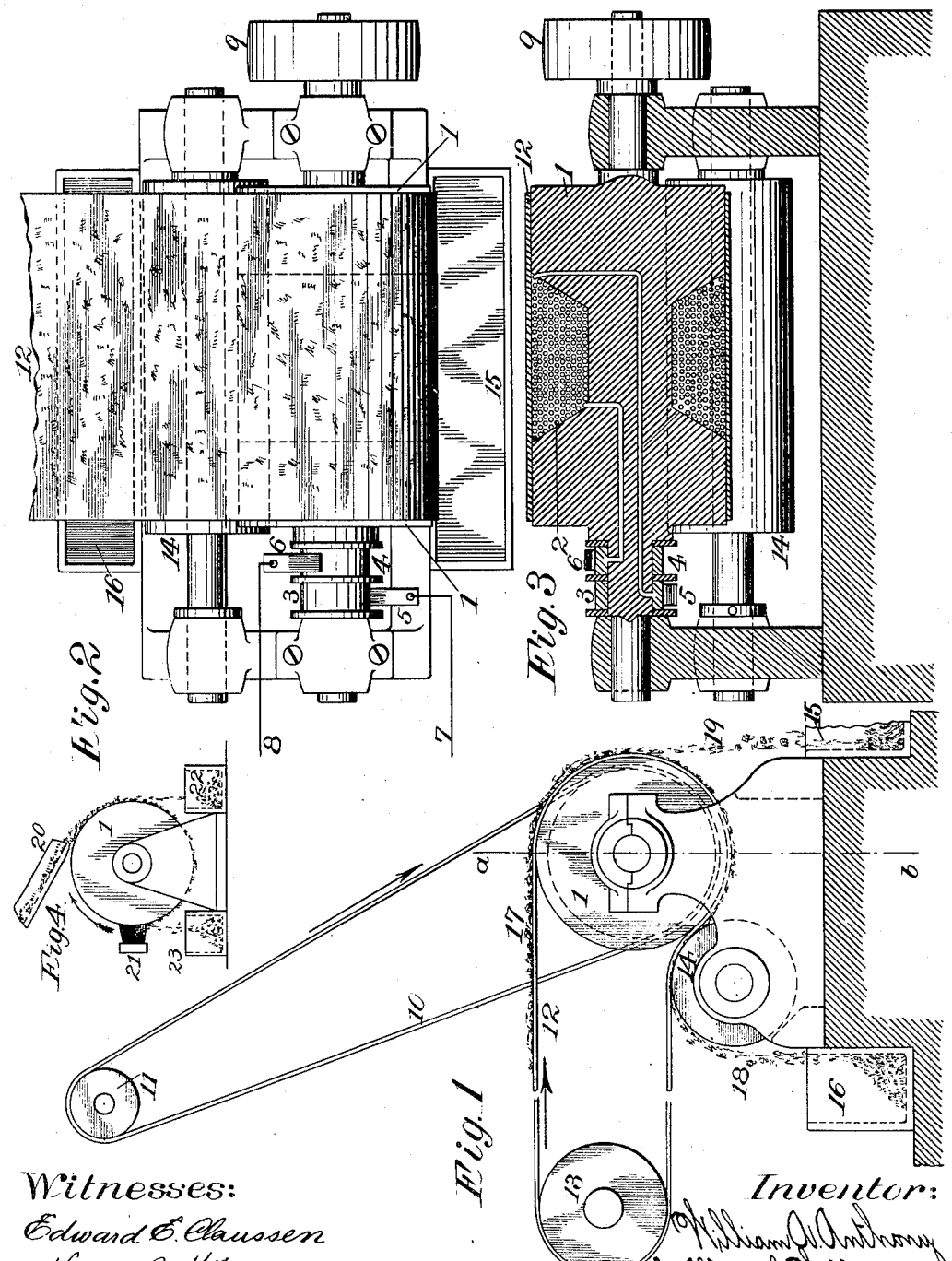
Witnesses:
Edward E. Claussen
Harry R. Williams.
Inventor:
William A. Anthony
by Albert H. Walker atty

UNITED STATES PATENT OFFICE.

WILLIAM A. ANTHONY, OF MANCHESTER, CONNECTICUT, ASSIGNOR TO THE MATHER ELECTRIC COMPANY, OF SAME PLACE.

ELECTRO-MAGNETIC SEPARATOR.

SPECIFICATION forming part of Letters Patent No. 411,414, dated September 24, 1889.

Application filed June 28, 1889. Serial No. 315,906. (No model.)

*To all whom it may concern:*

Be it known that I, WILLIAM A. ANTHONY, of Manchester, Connecticut, have invented a new and useful Electro-Magnetic Separator, of which the following description and claims constitute the specification, and which is illustrated by the accompanying sheet of drawings.

Figure 1 of the drawings is a side elevation of the apparatus. Fig. 2 is a plan view thereof. Fig. 3 is a central vertical section on the line $a\,b$ of Fig. 1. Fig. 4 is a side elevation of a modified form of the apparatus shown in the other figures.

The numeral 1 indicates a mass of iron in the form of a spool and with thick heavy heads. That spool is wound full with a coil of insulated wire 2, the ends of which are connected with the collector-rings 3 and 4, respectively, and those collector-rings are provided with the brushes 5 and 6, respectively, and those brushes are connected with the electrical conductors 7 and 8, respectively.

The spool 1 is provided with journals which revolve in bearings in the frame of the apparatus, and is caused to revolve by the pulley 9, which receives motion through the belt 10 from the pulley 11.

The spool 1 carries upon its periphery the endless non-magnetic apron 12, and that apron is also carried upon the periphery of the roller 13. The roller 14 revolves in bearings in the frame of the apparatus parallel with the spool 1 in substantially the position shown in Fig. 1, and is caused thus to revolve by the apron 12, the lower reach of which passes with tension over the roller 14 immediately in the rear of the spool 1. The receptacle 15 is placed below the forward part of the periphery of the spool 1, and the receptacle 16 is placed below the rearward part of the periphery of the roller 14.

The numeral 17 indicates the mixed magnetic and non-magnetic substances which are to be separated, and the numerals 18 and 19 indicate those magnetic and non-magnetic substances, respectively, after they are separated by the apparatus.

The modified form of Fig. 4 consists of the spool 1, which is identical in all respects and connections with the spool 1 in the other figures, and consists also of the spout 20, which conducts mixed magnetic and non-magnetic substances and discharges them upon the periphery of the spool, and consists, finally, of the brush or scraper 21, which removes the magnetic bodies in those substances from the periphery of the spool.

The mode of operation of the apparatus of Figs. 1, 2, and 3 is as follows: The pulley 11 runs the belt 10 in the direction indicated by the arrow adjacent to that belt, and revolution is thereby imparted to the pulley 9 and the spool 1, and motion is thus imparted by that spool to the apron 12 in the direction indicated by the arrow adjacent to that apron, and revolution is also imparted to the roller 14 in the direction opposite to that of the revolution of the spool 1. An electric current is contemporaneously caused to pass through the coil 2 from any suitable generator of electricity by means of the electrical connections 3, 4, 5, 6, 7, and 8. The mixed magnetic and non-magnetic substances are deposited and spread upon the upper side of the upper reach of the apron 12. As that part of that apron which carries those substances is carried forward around the periphery of the spool 1, the magnetic bodies therein are attracted and held to the outer surface of the apron against the attraction of gravitation, while the non-magnetic substances 19 fall into the receptacle 15. The magnetic bodies are held to the outer surface of the apron as long as the inner surface thereof is in contact with the spool 1 and where that contact ceases the magnetic attraction of the spool therefor operates, unless positively prevented, to draw the magnetic bodies which are clinging to the outer and under surface of the apron backward along that surface; but the roller 14 positively holds those bodies in place against that under surface until they are carried to the upper side of the periphery of that roller, whence they are carried by that periphery to the rearward side thereof and there allowed to fall into the receptacle 16.

The mode of operation of the apparatus of Fig. 4 is as follows: Motion is imparted to the spool 1 in the direction of the arrow adjacent to that spool by the same means as in the case of the other form of apparatus, and an electric current is contemporaneously caused to pass through the coil 2 of that spool from any suitable generator of electricity by means of the same electrical connections as those shown in Figs. 2 and 3. The mixed magnetic and non-magnetic substances are conducted by the spout 20 from any suitable receptacle thereof, and are deposited and spread upon the forward part of the upper side of the periphery of the spool. As that section of that periphery goes forward with the revolution of the spool the magnetic bodies in those substances are attracted and held thereto against the attraction of gravitation, while the non-magnetic substances fall into the receptacle 22. The magnetic bodies are held to the periphery of the spool until they are carried thereby into contact with the brush or scraper 21, by which they are dislodged and removed far enough from the periphery of the spool to allow the attraction of gravitation to overbalance the thus-diminished magnetism, and thus to carry those bodies into the receptacle 23.

The roller 14 may be omitted from the apparatus of Figs. 1, 2, and 3 and the lower reach of the apron 12 be permitted to pass directly from the lower side of the periphery of the spool 1 to the lower side of the roller 13; but in that case a scraper or brush, or other analogous device, will be required to remove the magnetic bodies from the surface of the apron. So, also, the electro-magnetic part of the apparatus, instead of being a mass of iron in the form of a spool, wound with an insulated coil, may sometimes be a Siemens drum-armature constructed and electrically connected as in a dynamo, or it may be a Siemens shuttle-armature, or it may be an armature of the Gramme type; but the coiled spool shown in the drawings is better than either of these, because it will develop a much stronger magnetic field than either of them.

I claim as my invention—

1. The combination of a revolving electro-magnet and an endless non-magnetic apron carried thereby and adapted to carry mixed magnetic and non-magnetic substances and to drop the non-magnetic bodies in those substances at one place, with a roller revolving parallel to the electro-magnet and under the endless apron and adapted to hold the magnetic bodies in those substances between it and that apron, and thus to carry them far enough out of the magnetic field to enable them to drop at another place when released from between the roller and the apron, all substantially as described.

2. The combination of the spool 1, wound with the coil 2 and electrically connected, substantially as described, with the endless non-magnetic apron 12, passing around and in contact with a part of the periphery of the spool 1 and adapted to carry mixed magnetic and non-magnetic substances upon its outer surface and to drop the non-magnetic bodies in those substances at one place, with a roller revolving parallel to the spool 1 and under the apron 12, and adapted to hold the magnetic bodies in those substances between it and that apron, and thus to carry them far enough out of the magnetic field to enable them to drop at another place when released from between the roller and the apron, all substantially as described.

3. In an electro-magnetic separator, the combination of the spool 1, wound with the coil 2 and electrically connected, substantially as described, and means, substantially as set forth, for removing magnetic substances from the magnetic field of that spool and coil, all substantially as described.

Hartford, Connecticut, June 27, 1889.

WILLIAM A. ANTHONY.

Witnesses:
ALBERT H. WALKER,
PHEBIE A. PHELPS.